United States Patent
Song et al.

(10) Patent No.: US 7,473,307 B2
(45) Date of Patent: Jan. 6, 2009

(54) ELECTROLESS COPPER PLATING SOLUTION, METHOD OF PRODUCING THE SAME AND ELECTROLESS COPPER PLATING METHOD

(75) Inventors: Ki Yong Song, Seoul (KR); Sung Hen Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/833,615

(22) Filed: Aug. 3, 2007

(65) Prior Publication Data

US 2008/0223253 A1 Sep. 18, 2008

(30) Foreign Application Priority Data

Mar. 13, 2007 (KR) .................. 10-2007-0024433

(51) Int. Cl.
*C23C 18/40* (2006.01)
(52) U.S. Cl. .................. 106/1.23; 106/1.26
(58) Field of Classification Search ............. 106/1.23, 106/1.26; 427/443.1
See application file for complete search history.

(56) References Cited

U.S. PATENT DOCUMENTS

| | | | | | |
|---|---|---|---|---|---|
| 4,099,974 | A | * | 7/1978 | Morishita et al. | 106/1.23 |
| 4,557,762 | A | * | 12/1985 | Nakaso et al. | 106/1.23 |
| 5,256,441 | A | * | 10/1993 | Huenger et al. | 427/443.1 |
| 5,503,877 | A | * | 4/1996 | Stamp et al. | 427/98.1 |
| 5,965,211 | A | * | 10/1999 | Kondo et al. | 427/443.1 |
| 6,528,409 | B1 | * | 3/2003 | Lopatin et al. | 438/618 |
| 6,660,071 | B2 | * | 12/2003 | Yoshida et al. | 106/1.23 |
| 6,875,474 | B2 | * | 4/2005 | Kohl et al. | 106/1.23 |
| 7,169,216 | B2 | * | 1/2007 | Itabashi et al. | 106/1.23 |
| 2003/0024431 | A1 | * | 2/2003 | Inoue et al. | 106/1.23 |
| 2007/0004201 | A1 | * | 1/2007 | Lubomirsky et al. | 438/678 |
| 2007/0099422 | A1 | * | 5/2007 | Wijekoon et al. | 438/687 |

FOREIGN PATENT DOCUMENTS

| | | |
|---|---|---|
| JP | SHO52-17334 | 2/1977 |
| JP | SHO052-17335 | 2/1977 |
| JP | 07286281 A * | 10/1995 |

OTHER PUBLICATIONS

"On the Mechanism of Electroless Copper Deposition" Authors: Wiese, et al.; Ber. Bungsenges. Phys. Chem. 91, 619-626 (1987).

* cited by examiner

*Primary Examiner*—Helene Klemanski
(74) *Attorney, Agent, or Firm*—Cantor Colburn LLP

(57) ABSTRACT

Disclosed herein is an electroless copper plating solution, including a copper salt, a completing agent, a reductant and a pH adjuster, in which the plating solution includes a 2,2-dipyridyl acid solution and the hydrogen ion concentration (pH) thereof is about 11.5 to about 13.0, a method of producing the same, and an electroless copper plating method. According to the plating solution of the present invention, an electroless copper plating film having stable and improved adhesivity and low electrical resistance can be obtained. Further, display devices including a metal pattern formed with the electroless copper plating solution can improve the reliability and price competitiveness of products prepared therefrom.

21 Claims, 1 Drawing Sheet

FIGURE
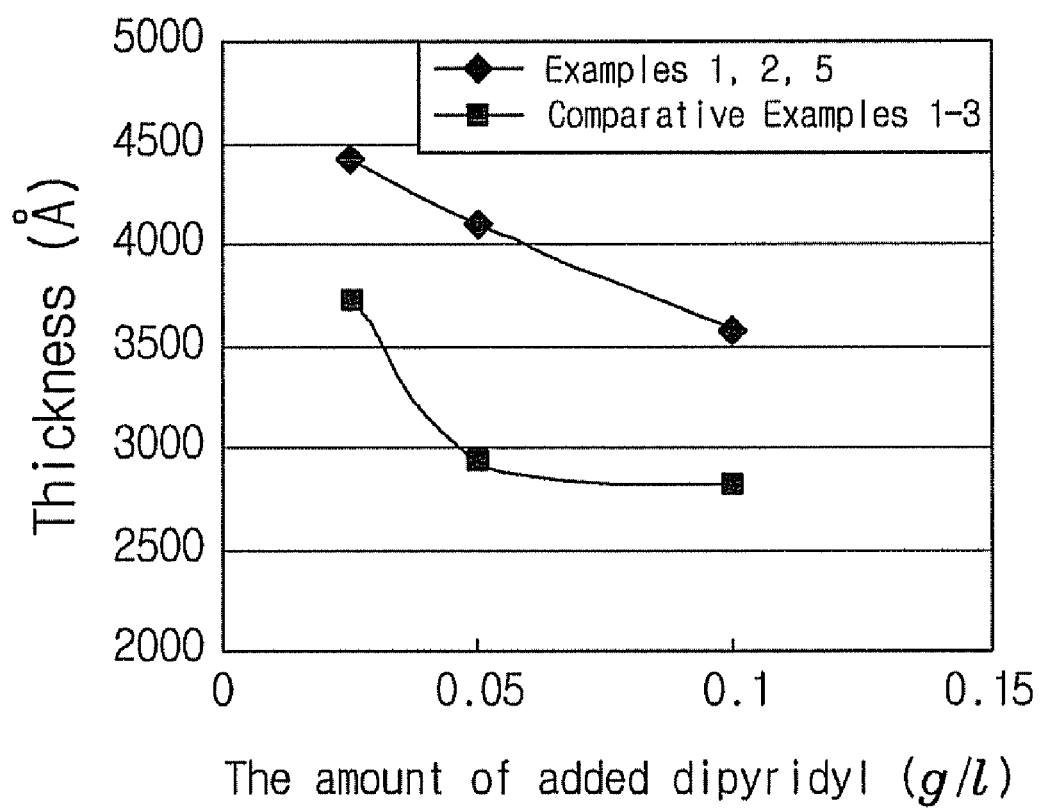

ELECTROLESS COPPER PLATING SOLUTION, METHOD OF PRODUCING THE SAME AND ELECTROLESS COPPER PLATING METHOD

CROSS-REFERENCE TO RELATED PATENT APPLICATIONS

This application claims priority to Korean Patent Application No. 10-2007-0024433, filed on Mar. 13, 2007, and all the benefits accruing therefrom under 35 U.S.C. § 119, the content of which is incorporated herein by reference in its entirety.

BACKGROUND OF THE INVENTION

1. Field of the Invention

The present invention relates to an electroless copper plating solution, a method of producing the same, and an electroless copper plating method, and, more particularly, to an electroless copper plating solution including a copper salt, a complexing agent, a reductant and a pH adjuster, in which the plating solution includes a 2,2-dipyridyl acid solution and the hydrogen ion concentration (pH) thereof is about 11.5 to about 13.0, a method of producing the same, and an electroless copper plating method.

2. Description of the Related Art

In electronic devices such as integrated circuit ("IC"), liquid crystal displays ("LCD") and the like, as the degree of integration increases and the size decreases metal wiring, which must be formed on a substrate, is commensurately miniaturized. Accordingly, the cross-sectional area of the metal wiring decreases, and the total length of the metal wiring increases, so that the net resistance of the metal wiring is substantially increased overall. The increase in resistance in the metal wiring of display devices causes the display quality of display devices to deteriorate due to signal delay. This delay can become problematic, particularly for the development of high image quality and large sized TFT-LCDs. Accordingly, it is desirable to decrease the resistance of metal wiring.

Copper as a conductive material has relatively low specific resistance and excellent electromigration resistance. Accordingly, when copper is used for wiring, it is desirable that current carrying capacity will remain unchanged in proportion to miniaturization and high integration density of the smaller devices. Suitable methods of forming copper wiring include electroless plating which is a method of plating a metal film by the reaction of between a reductant and an oxidant in solution to provide the metal at the surface of an activated substrate. Advantageously, since the electroless plating method does not require formation of an additional seed layer, and is performed uniformly and simultaneously throughout the entire substrate without using an external power source, the deterioration of uniformity due to the current-resistance ("IR") drop is improved, the manufacturing cost is low, processes are simple, and thus productivity is high.

Generally, an electroless copper plating solution includes a source of copper ions, a complexing agent for copper ions, a reductant for copper ions, and a pH adjuster. When copper plating was performed using the electroless copper plating solution, obtaining a plating film having high adhesion was difficult, the speed of forming a metal plating film was low, and uniform plating of the entire substrate was difficult.

Various additives can be added to a plating solution for electroless copper plating, so as to improve the stability and material properties of the plating solution and the characteristics of the copper pattern formed therefrom. For example, Japanese Unexamined Patent Application Publication No. sho52-17334 discloses an electroless copper plating solution containing one or more additives selected from the group consisting of murexide, eriochrome black T, and methyl violet. Further, Japanese Unexamined Patent Application Publication No. sho52-17335 discloses an electroless copper plating solution containing, as an additive, one or more selected from the group consisting of pyridine, 4-vinylpyridine, 2-aminopyridine, 2-methylpyridine, 3-methylpyridine-4-methylpyridine, 2-ethylpyridine, 3-(n-propyl)pyridine, and 2-hydroxypyridine. However, neither of these conventional electroless plating solutions can provide a copper film that exhibiting both sufficiently low electrical resistance and excellent adhesivity.

BRIEF SUMMARY OF THE INVENTION

Accordingly, to overcome the above problems of the prior art, in an embodiment, there is provided an electroless copper plating solution which can be used to form a copper plating film having excellent adhesivity and low electrical resistance, and a method of producing the same.

In another embodiment, an electroless copper plating method is provided which can be used to form an electroless copper plating film having stable and improved adhesivity and low electrical resistance.

In another embodiment, an electroless copper plating solution, includes a copper salt, a complexing agent, a reductant and a pH adjuster, in which the plating solution includes a 2,2-dipyridyl acid solution and the hydrogen ion concentration (pH) thereof is about 11.5 to about 13.0.

In another embodiment, the molar ratios of the complexing agent and reductant to the copper salt can be about 1:3 and about 1:4, respectively. For example, the electroless copper plating solution of the present invention can include a copper salt in an amount of about 0.01 to about 0.05 mol/$\ell$; a complexing agent in an amount of about 0.03 to about 0.15 mol/$\ell$; a reductant in an amount of about 0.04 to about 0.20 mol/$\ell$; a pH adjuster in an amount of about 0.1 to about 0.2 mol/$\ell$; and a 2,2-dipyridyl acid solution in an amount of about 0.1 to about 0.5 mmol/$\ell$.

In another embodiment, a method of producing an electroless copper plating solution, comprises dissolving a copper salt, a complexing agent and a reductant in water to prepare a plating solution; dissolving 2,2-dipyridyl in a mixed solution of water and acid to prepare a dipyridyl acid solution; mixing the dipyridyl acid solution with the plating solution; and adjusting the hydrogen ion concentration (pH) of the plating solution from about 11.5 to about 13.0 with a pH adjuster.

In a further embodiment, an electroless copper plating method is provided, in which the plating is performed with the electroless copper plating solution.

BRIEF DESCRIPTION OF THE DRAWINGS

The above and other features and advantages will be more clearly understood from the following detailed description taken in conjunction with the accompanying drawings, in which:

The FIGURE is a graph showing the change of thickness of an exemplary plating film formed with an electroless copper plating solution produced in Examples 1, 3, and 5 and Comparative Examples 1-3, and which is dependent on the amount of added dipyridyl.

DETAILED DESCRIPTION OF THE INVENTION

Hereinafter, the present invention will be described in detail.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layers and regions are exaggerated for clarity.

The electroless copper plating solution includes a copper salt, a complexing agent, a reductant and a pH adjuster. Specifically, in an embodiment, the plating solution includes a 2,2-dipyridyl acid solution, and the hydrogen ion concentration (pH) thereof is about 11.5 to about 13.0.

The electroless copper plating solution is useful for forming a copper pattern on a surface of a substrate such as a glass substrate, a silicon substrate, an alumina substrate, an insulation ceramic substrate, a polyimide substrate, a ferrite substrate, or the like. Where a metal (e.g., copper) pattern is formed with the electroless plating solution, the copper pattern so obtained has excellent adhesivity to base materials and excellent specific resistance characteristics.

Specifically, in an embodiment, where a dipyridyl acid solution is used, and since dipyridyl is easily dissolved in acid, a uniform solution can be made by melting the pyridyl completely, and the molten dipyridyl solution can be added with precision. Acids that can be used to dissolve dipyridyl include, but are not limited to, nitric acid, sulfuric acid, acetic acid, hydrochloric acid, and the like. In an exemplary embodiment, nitric acid, which easily dissolves copper, is used as the acid.

The pH range of the electroless copper plating solution can vary depending on the kind of reductant. However, generally, the pH of the electroless copper plating solution is about 11.5 to about 13.0, and specifically about 12.3 to about 12.8. It is desirable that the pH thereof be as high as possible, to allow for sufficient plating speed. When the pH of the plating solution is below about 11.5, the speed of forming a copper plating film decreases, and the resulting copper plating film can blister after copper plating, thereby causing insufficient adhesivity for the copper plating film. In contrast, when the pH of the plating solution is above about 13.0, the speed of forming a copper plating film decreases, and the stability of the plating solution deteriorates.

It is desirable that the bath temperature of the copper plating solution be about 40 to about 70° C. to provide stability of the bath and the desired speed of forming a plating film.

In the electroless copper plating solution, the molar ratios of complexing agent to copper salt can be, in an embodiment, about 1:3, and the molar ratio of reductant to copper salt is about 1:4.

For example, the electroless copper plating solution of the present invention can include a copper salt in an amount of about 0.01 to about 0.05 mol/$\ell$; a complexing agent in an amount of about 0.03 to about 0.15 mol/$\ell$; a reductant in an amount of about 0.04 to about 0.20 mol/$\ell$; a pH adjuster in an amount of about 0.1 to about 0.2 mol/$\ell$; and a 2,2-dipyridyl acid solution in an amount of about 0.1 to about 0.5 mmol/$\ell$.

In the electroless copper plating solution, examples of copper salts, which are sources of copper ions, may include, but are not limited to, copper salts of chloride, nitrate, sulfate, and cyanide. Specifically, in an embodiment, the copper salt may be selected from the group consisting of copper sulfate, copper nitrate, copper (II) chloride, copper formate, and a mixture thereof, but is not limited thereto.

The complexing agent which can be used may include, but is not limited to, a chelator such as an ammonia solution, acetic acid, guanylic acid, stannate, ethylene diamine tetraacetic acid ("EDTA") or the like, and an organic amine compound. In embodiment, a chelator such as EDTA, or the like, be used as the complexing agent. Specifically, the complexing agent may be selected from the group consisting of ethylenediamine tetraacetic acid, hydroxyethyl ethylene triacetic acid, cyclohexanediamine tetraacetic acid, diethylenetriamine pentaacetic acid, tetrakis(2-hydroxypropyl)ethylenediamine, and a mixture thereof, but is not limited thereto.

The reductant may be selected from the group consisting of formaldehyde, paraformaldehyde, glyoxylic acid, $NaBH_4$, $KBH_4$, $NaH_2PO_2$, hydrazine, formalin, polysaccharide, such as glucose, and a mixture thereof.

Acid compounds or alkali compounds are useful as a pH adjuster. Specifically, the pH adjuster may be selected from the group consisting of alkali hydroxides such as lithium hydroxide, sodium hydroxide, potassium hydroxide, tetramethylammonium hydroxide, tetraethylammonium hydroxide, and a mixture thereof.

The additive, which is used herein to improve the mechanical properties of the plating film formed with the plating solution, and the stability of the plating solution, can include 1,10-phenanthroline, 2,9-dimethyl-1,10-phenanthroline, polyalkylene glycol, and similar materials.

Typically, formaldehyde is oxidized through the following Equation 1, thereby generating and emitting electrons.

Equation 1

$$HCHO+H_2O=CH_2(OH)_2 \quad (1)$$

$$2CH_2(OH)_2+OH^-=CH_2CHO^-+H_2O \quad (2)$$

$$CH_2CHO^-=CHCHO^-(ad)+H(ad) \quad (3)$$

$$CHCHO^-(ad)+OH^-=2HCOO^-+2H_2O+2e- \quad (4)$$

$$2H(ad)=H_2 \quad (5)$$

In the Equation 1, the subscript "(ad)" indicates the state in which the subscripted reaction intermediate is adsorbed on the surface of a plating target. Here, the reaction intermediate, represented by "CHOHO⁻(ad)" in steps (3) and (4) of Equation 1, activates a precipitation reaction of copper, which is a local cathode reaction, among plating reactions. This phenomenon was examined by Harm Wiese et al., and was disclosed in a document [*Ber. Bunsenges. Phys. Chem.* 1987, vol. 91, pp. 619-626].

The plating solution, if necessary, can include a pH buffer or a modifier other than the above additives in order to improve the material properties of a plating film. Various organic acids and weak acidic inorganic compounds, such as for example, formic acid, acetic acid, propionic acid, ammonium chloride, ammonium sulfate, ammonium acetate or the like, can be used as the pH buffer, and compounds which can improve the coating and planarizing characteristics of a plating film can be used as the modifier. Such a modifier can include: a stabilizer, such as for example an ammonia solution, acetic acid, guanic acid, a salt of tartaric acid, ethylenediamine tetraacetic acid ("EDTA"), or an organic amine compound such as pyridine, benzotriazole, imidazole, or tetramethylethylene diamine ("TMEDA") which stabilizes metals in a solution by forming complexes in combination with metal ions; a surfactant such as for example poly(ethylene glycol) polymers or poly(ethylene glycol-propylene glycol) copolymers, which decreases surface tension to effectively allow removal of by-products, such as hydrogen, by dissipation where such by-products are generated during the electroless plating process from the dehydrogenation of the reductant; an accelerator, such as for example a sulfur compound including mercaptopropionic acid disulfide, formamidine disulfide, or the like, which accelerates the formation of a thin film, and the like.

In another embodiment, a method of producing the electroless copper plating solution is disclosed. In an embodiment, the electroless copper plating solution is produced by dissolving a copper salt, a complexing agent, and a reductant in water. In one embodiment, the plating solution can be prepared by simultaneously adding a copper salt, a complexing agent and a reductant into water, and stirring to dissolve them, or in another embodiment, the plating solution can be prepared sequentially by adding a copper salt to water and stirring the solution to dissolve the copper salt, adding a complexing agent thereinto and stirring the solution to dissolve the complexing agent, and then adding a reductant thereinto and stirring the solution to dissolve reductant.

Herein, dipyridyl is included in the plating solution by first preparing an acid solution thereof, and the acid solution is added into the plating solution. This dipyridyl acid solution can be prepared by dissolving 2,2-dipyridyl in a mixed solution of water and an acid. Subsequently, the hydrogen ion concentration (pH) of the plating solution is adjusted with a pH adjuster such that it is in the range of about 11.5 to about 13.0. The process of adjusting the pH of the plating solution can be performed after the preparation of a plating solution including a copper salt, a complexing agent, a reductant, and dipyridyl.

The pH range of the electroless copper plating solution herein can vary depending on the kind of reductant. However, generally, the pH of the electroless copper plating solution is about 11.5 to about 13.0, and specifically in the range of about 12.3 to about 12.8. It is desirable that the pH thereof be as high as possible, to provide a desirable plating speed.

In the preparation of the plating solution, in an embodiment, the molar ratios of complexing agent and reductant to copper salt can be about 1:3 and about 1:4, respectively. For example, the electroless copper plating solution can include a copper salt in an amount of about 0.01 to about 0.05 mol/$\ell$; a complexing agent in an amount of about 0.03 to about 0.15 mol/$\ell$; a reductant in an amount of about 0.04 to about 0.20 mol/$\ell$; a pH adjuster in an amount of about 0.1 to about 0.2 mol/$\ell$; and a 2,2-dipyridyl acid solution in an amount of about 0.1 to about 0.5 mmol/$\ell$.

Exemplary copper salts, which are sources of copper ion, can include, but are not limited to, chloride, nitrate, sulfate, and cyanide. Specifically, the copper salt may be selected from the group consisting of copper sulfate, copper nitrate, copper (II) chloride, copper formate, and a mixture thereof.

The complexing agent may include, but is not limited to, a chelator, such as an ammonia solution, acetic acid, guanylic acid, stannate, EDTA or the like, or an organic amine compound. All complexing agents used to produce the electroless copper plating solution can be used as the complexing agent. Specifically, in an embodiment, the complexing agent which can be used can be selected from the group consisting of ethylenediamine tetraacetic acid, hydroxyethyl ethylene triacetic acid, cyclohexanediamine tetraacetic acid, diethylenetriamine pentaacetic acid, tetrakis(2-hydroxypropyl)ethylenediamine, and a mixture thereof, but is not limited thereto.

The reductant can be selected from the group consisting of formaldehyde, paraformaldehyde, glyoxylic acid, $NaBH_4$, $KBH_4$, $NaH_2PO_2$, hydrazine, formalin, polysaccharides such as glucose, and a mixture thereof.

Acid compounds or alkali compounds are useful as the pH adjuster. For example, the pH adjuster can be selected from the group consisting of alkali hydroxides, such as lithium hydroxide, sodium hydroxide, and potassium hydroxide; tetramethylammonium hydroxide; tetraethylammonium hydroxide; and a mixture thereof.

To improve the mechanical properties of a plating film prepared from the plating solution, and to improve the stability of the plating solution, other additives, such as 1,10-phenanthroline, 2,9-dimethyl-1,10-phenanthroline, polyalkylene glycol, and the like, can be added to the plating solution to improve plating.

In a further embodiment, plating by an electroless copper plating method is performed with the electroless copper plating solution disclosed herein.

Where the electroless plating is performed with the method, the plating is performed by immersing a plating target into a plating bath for a predetermined time. In this case, in order to form a plurality of metal cores and thus easily perform an electroless plating process, the plating target may be activated with a catalyst, such as copper, gold, silver, palladium or the like, before the plating is performed. In an embodiment, a plating film can be formed into a multi-layered metal film by growing two or more kinds of metal sequentially.

In addition, an annealing process can be performed if desired to remove water remaining in the plating film obtained by forming the plating film by electroless copper plating, to thereby improve the electrical properties and adhesivity of the plating film. The annealing process can be performed in a nitrogen, argon or vacuum atmosphere at about 40 to about 400° C. for about 15 to about 120 minutes.

The electroless copper plating method of the present invention may be used for manufacturing various display devices, such as liquid crystal display ("LCD"), plasma display panel ("PDP"), electro luminescent display ("ELD") and electrochromic display ("ECD"), as well as flat sensors such as X-ray imaging devices, and the like. In particular, where the electroless copper plating method is used for manufacturing liquid crystal displays, the manufacturing cost of the liquid crystal displays can advantageously be reduced, and large-sized liquid crystal displays can be manufactured.

Hereinafter, the present invention will be described in detail with reference to Examples. Here, these Examples are set forth to illustrate the present invention, but should not be construed as limiting the present invention.

EXAMPLES

Example 1

800 ml of deionized water was added to a 1.5 l vessel, copper(II) sulfate pentahydrate ($CuSO_4 \cdot 5H_2O$), tetrasodium ethylenediamine tetraacetate ("EDTA·4Na") and formaldehyde, in the following amounts, were sequentially added thereto, and the mixture was then stirred. Subsequently, 1 ml of nitric acid was put into 99 ml of water and then stirred, 1 g of 2,2-dipyridyl was added thereto, and the mixture was then stirred until the 2,2-dipyridyl was completely dissolved, thereby preparing a 2,2-dipyridyl nitric acid solution. Then, the prepared 2,2-dipyridyl nitric acid solution was added to a plating solution. Subsequently, the pH of the plating solution was adjusted to 12.6 with sodium hydroxide (NaOH) as a pH adjuster, and the plating solution was then stirred for 1 hour, to provide the electroless copper plating solution.

Molybdenum was deposited by sputtering to a thickness of 50 nm on a glass substrate, and the molybdenum coated glass substrate was patterned by first coating a photoresist and patterning with a photolithographic process, followed by wet etch to transfer the pattern, and removal of the residual photoresist pattern. Subsequently, in order to form a seed layer for performing electroless copper plating, the glass substrate was immersed in a palladium solution (deionized water 1 l, conc-hydrochloric acid 2 ml, $PdCl_2$ 0.03 g) for 60 seconds, thereby activating the patterned Mo coated surface of the glass substrate.

Subsequently, electroless copper plating was performed on the activated and patterned glass substrate with an electroless copper plating solution for 20 minutes to obtain a plating film. Next, the adhesivity and specific resistance of the obtained plating film was evaluated, and the results thereof are shown in the following Table 1.

[Composition of a Plating Solution]
copper(II) sulfate pentahydrate ($CuSO_4 \cdot 5H_2O$) 5.99 g/l
tetrasodium ethylenediamine tetraacetate (EDTA·4Na) 26.99 g/l
formaldehyde (37 wt %) 7.47 ml/l
2,2-dipyridyl nitric acid 5 mL(0.05 g/l)
sodium hydroxide 5.59 g/l
[Plating Condition]
Plating solution pH: 12.6
Plating solution temperature 60° C.
[Method of Evaluating Material Properties of a Plating Film]
* adhesivity: the adhesivity of the plating film to the patterned metal structure (thickness 4500 Å, line width 7 μm) obtained in Examples was evaluated through an adhesive tape peeling test. In the adhesive tape peeling test, a piece of adhesive tape (for example, scotch tape) was adhered to an plating film to prevent air from being trapped between the adhesive tape and the plating film, and then the tape was separated from the plating film at one sweep. Thereafter, the degree of peeling of the plating film was observed.
* Thickness measurement: The thickness of a plating film was measured with a Surface profiler P-10, available from Tencor Corp.
* Specific resistance: The specific resistance of a plating film was measured using a 4-point probe. The specific resistance values were calculated by multiplying 4-point values by the thickness of the plating film.
* blistering area: The blistering area was represented by converting the area which was blistered after the plating process, and thus was not easily adhered, into a percentage (%) of the total area.

Examples 2-5

The electroless plating was performed as in Example 1, except that the amount of dipyridyl added at the time of preparing a dipyridyl nitric acid solution was 0.025 g/l, 0.038 g/l, 0.063 g/l and 0.1 g/l for Examples 2-5, respectively. The material properties of the obtained plating film were evaluated, and the results thereof were shown in the following Table 1.

Comparative Examples 1-3

The electroless plating was performed as in Example 1, except that $K_4[Fe(CN)_6] \cdot 3H_2O$ was added to the electroless copper plating solution and the amount of dipyridyl added at the time of preparing a dipyridyl nitric acid solution was 0.025 g/l, 0.5 g/l, and 0.1 g/l corresponding to Comparative Examples 1-3, respectively. The material properties of the obtained plating film were evaluated, and the results thereof are shown in the following Table 1.
[Composition of a Plating Solution]
copper(II) sulfate pentahydrate ($CuSO_4 \cdot 5H_2O$) 5.99 g/l
tetrasodium ethylenediamine tetraacetate (EDTA·4Na) 26.99 g/l
formaldehyde (37 wt %) 7.47 ml/l
2,2-dipyridyl nitric acid 2.5 mL(0.25 g/l), 5 mL(0.05 g/l) and 10 mL(0.1 g/l)
sodium hydroxide 5.59 g/l
$K_4[Fe(CN)_6] \cdot 3H_2O$:0.03 g/l
[Plating Condition]
Plating solution pH: 12.6
Plating solution temperature: 60° C.

TABLE 1

| $K_4FeCN$ | Dipyridyl | 0.025 g/L | 0.038 g/L | 0.05 g/L | 0.063 g/L | 0.1 g/L |
|---|---|---|---|---|---|---|
| | | Ex. 2 | Ex. 3 | Ex. 1 | Ex. 4 | Ex. 5 |
| 0 g/L | Blistering | 10% | 0.4% | 0.3% | 0% | 10% |
| | Thickness (Å) | 4420 | 3590 | 4100 | 3670 | 3580 |
| | Specific resistance (μΩ/cm) | 2.41 | 2.60 | 2.75 | 2.81 | 2.75 |
| | | CEx. 1 | | CEx. 2 | | CEx. 3 |
| 0.03 g/L | Blistering | 20% | — | 40% | — | 10% |
| | Thickness (Å) | 3760 | — | 2950 | — | 2820 |
| | Specific resistance (μΩ/cm) | 2.48 | — | 2.68 | — | 2.89 |

Referring to Table 1, it was found that, in the case of Examples 1-5, in which a dipyridyl nitric acid solution was used as an additive, optimal results were realized in the aspect of the adhesivity and specific resistance of a plating film, but, in the case of Comparative Examples 1-3, in which a cyanide compound was used as an additive, the speed of forming a copper plating film was decreased and the adhesivity of a plating film was very low compared to Example 1-5. Further, in the case where the dipyridyl nitric acid solution was not used, the plating film was completely peeled off, and thus the material properties thereof could not be measured.

The speed of forming a plating film was measured depending on the amount of dipyridyl added in Example 1-5 and Comparative Examples 1-3, and the results thereof are shown in the FIGURE. As shown in the FIGURE, it was found that, when both dipyridyl and cyanide compounds were used, the speed of forming a plating film decreased.

Examples 6-16 and Comparative Examples 4-7

The electroless plating was performed as in Example 1, except that the molar ratios of a complexing agent to a copper salt and a reductant were varied as shown in Table 2. The material properties of the obtained plating film were evaluated, and the results thereof are also shown in the following Table 2. In the following Table 2, the units of each of the components are in mol/$\ell$. It can be seen in the data in Table 2 that adhesion as measured by blistering is acceptable for all levels of complexing agent tested, for copper salt levels of 0.001-0.025 mol/$\ell$, and for reductant levels of 0.004-0.1 mol/$\ell$ (where the molar ratio of copper salt to reductant is about 1:4; see Exs. 6-14). Also in the data, adhesion decreases generally with amounts of copper salt greater than or equal to 0.5 mol/$\ell$, and of reductant greater than or equal to 0.1 mol/$\ell$ (see CEx. 4-8), though blistering at the higher loading (0.2 mol/$\ell$) of complexing agent is acceptable at this copper and reductant level (Ex. 15).

TABLE 2

| Complexing agent | Copper salt (mol/l) | | | | |
|---|---|---|---|---|---|
| | 0.001 | 0.01 | 0.025 | 0.05 | 0.1 |
| | Reductant (mol/l) | | | | |
| (mol/l) | 0.004 | 0.04 | 0.1 | 0.2 | 0.4 |
| | Ex. 6 | Ex. 7 | Ex. 8 | CEx. 4 | CEx. 5 |
| 0.04 | Blistering | 0% | 0.3% | 0.3% | 20% | 50% |
| | Thickness (Å) | 800 | 3500 | 3800 | 3300 | 3600 |
| | Specific resistance (μΩ/cm) | 7.65 | 2.74 | 3.52 | 4.55 | 4.78 |
| | Ex. 9 | Ex. 10 | Ex. 11 | CEx. 6 | CEx. 7 |
| 0.1 | Blistering | 0% | 0% | 0.3% | 25% | 35% |
| | Thickness (Å) | 950 | 1900 | 4100 | 3200 | 3600 |
| | Specific resistance (μΩ/cm) | 6.96 | 4.87 | 2.75 | 3.56 | 4.55 |
| | Ex. 12 | Ex. 13 | Ex. 14 | Ex. 15 | Ex. 16 |
| 0.2 | Blistering | 0% | 0% | 0% | 0.5% | 10% |
| | Thickness (Å) | 900 | 1500 | 3100 | 4300 | 3600 |
| | Specific resistance (μΩ/cm) | 7.35 | 5.36 | 4.78 | 3.05 | 4.32 |

Examples 17-22 and Comparative Examples 8-16

The electroless plating was performed as in Example 1, except that the molar ratios of the reductant to the copper salt and the complexing agent were varied, as shown in Table 3. The material properties of the obtained plating film were evaluated, and the results thereof are shown in the following Table 3. It can be seen in the data in Table 3 that adhesion as measured by blistering is acceptable for a narrower range of copper salt and complexing agent levels for a given level of Reductant tested. In particular, the lowest level of blistering occurs with 0.001 mol/$\ell$ copper salt, 0.003 mol/$\ell$ complexing agent and 0.04 mol/$\ell$ of reductant (Ex. 18); for 0.01 mol/$\ell$ copper salt, 0.03 mol/$\ell$ complexing agent, and 0.1 mol/$\ell$ of reductant (Ex. 21); and for 0.025 mol/$\ell$ copper salt, 0.075 mol/$\ell$ complexing agent, and 0.2 mol/$\ell$ of reductant (Ex. 22).

TABLE 3

| Reductant | Copper salt (mol/l) | | | | |
|---|---|---|---|---|---|
| | 0.001 | 0.01 | 0.025 | 0.05 | 0.1 |
| | Complexing agent (mol/l) | | | | |
| (mol/l) | 0.003 | 0.03 | 0.075 | 0.15 | 0.3 |
| | Ex. 17 | Ex. 18 | Ex. 19 | CEx. 8 | CEx. 9 |
| 0.04 | Blistering | 10% | 0.3% | 10% | 20% | 25% |
| | Thickness (Å) | 1500 | 3500 | 3000 | 2500 | 2200 |
| | Specific resistance (μΩ/cm) | 6.35 | 2.74 | 3.58 | 4.22 | 5.37 |
| | CEx. 10 | Ex. 20 | Ex. 21 | CEx. 11 | CEx. 12 |
| 0.1 | Blistering | 20% | 10% | 0.3% | 25% | 30% |
| | Thickness (Å) | 3200 | 3500 | 4100 | 3800 | 3500 |
| | Specific resistance (μΩ/cm) | 7.8 | 4.66 | 2.75 | 3.33 | 5.67 |
| | CEx. 13 | CEx. 14 | CEx. 15 | Ex. 22 | CEx. 16 |
| 0.2 | Blistering | 50% | 30% | 15% | 0.5% | 40% |
| | Thickness (Å) | 3500 | 3800 | 4000 | 4300 | 4700 |
| | Specific resistance (μΩ/cm) | 6.5 | 4.02 | 3.78 | 3.05 | 3.2 |

Example 23 and Comparative Examples 17 and 18

The electroless plating was performed as in Example 1, except that the hydrogen ion concentration (pH) of a plating solution agent was adjusted to 11.4 (Comparative Example 18) and 13.1 (Comparative Example 17), respectively, and the plating times were 5 minutes, 7 minutes, and 10 minutes. Example 23, at a pH of 12.6, was also run under otherwise identical conditions. The material properties of the obtained plating film were evaluated, and the results thereof are shown in the following Table 4.

TABLE 4

| | Ph | Plating time | 5 minutes | 7 minutes | 10 minutes |
|---|---|---|---|---|---|
| CEx. 17 | pH 13.1 | Blistering | 1% | 2% | 15% |
| | | Thickness (Å) | 1900 | 2100 | 3500 |
| | | Specific resistance (μΩ/cm) | 2.56 | 2.59 | 2.36 |
| Ex. 23 | pH 12.6 | Blistering | 1% | 0.5% | 5% |
| | | Thickness (Å) | 1760 | 2500 | 3200 |
| | | Specific resistance (μΩ/cm) | 2.68 | 2.63 | 2.23 |
| CEx. 18 | pH 11.4 | Blistering | 1%-⅓ peeled by a tape | 10%-⅔ peeled by a tape | 30% |
| | | Thickness (Å) | 1500 | 1800 | 3400 |
| | | Specific resistance (μΩ/cm) | 2.53 | 2.28 | 2.40 |

As shown in Table 4, where the hydrogen ion concentration (pH) of a plating solution agent is within the range of the present invention (Ex. 23), the adhesivity of the plating film was excellent and thus almost none of the plating film peeled off (with only 5% blistering at 10 min. deposition time for Example 23), and the specific resistance thereof was excellent, for copper plating films at desirable thicknesses, and at a desirable deposition rate. However, where the hydrogen ion concentration (pH) of a plating solution agent is outside of (i.e., higher than or lower than) the range disclosed in the present invention, the adhesivity and specific resistance thereof deteriorated (CEx. 17, 18).

As described above, where a copper pattern is formed with an electroless plating solution as disclosed herein, the adhesivity and specific resistance of the plating film deposited with the electroless plating solution are both improved, so that display devices that include the metal pattern prepared according to the present invention can have improved reliability and price competitiveness for products prepared therewith.

Although the preferred embodiments of the present invention, described above, have been disclosed for illustrative purposes, those skilled in the art will appreciate that various modifications, additions and substitutions are possible, without departing from the scope and spirit of the invention as disclosed in the accompanying claims.

What is claimed is:

1. An electroless copper plating solution, comprising:
   a copper salt;
   a complexing agent;
   a reductant, wherein the reductant is selected from the group consisting of formaldehyde, paraformaldehyde, mixtures thereof, and mixtures thereof with glyoxylic acid; and
   a pH adjuster,
   wherein the plating solution comprises a 2,2-dipyridyl acid solution and the hydrogen ion concentration (pH) of the plating solution is about 11.5 to about 13.0.

2. The electroless copper plating solution according to claim 1, wherein the molar ratio of the complexing agent to the copper salt is about 1:3, and the molar ratio of reductant to the copper salt is about 1:4.

3. The electroless copper plating solution according to claim 1, wherein the plating solution comprises:
   the copper salt in an amount of about 0.01 to about 0.05 mol/ℓ;
   the complexing agent in an amount of about 0.03 to about 0.15 mol/ℓ;
   the reductant in an amount of about 0.04 to about 0.20 mol/ℓ;
   the pH adjuster in an amount of about 0.1 to about 0.2 mol/ℓ; and
   the 2,2-dipyridyl acid solution in an amount of about 0.1 to about 0.5 mmol/ℓ.

4. The electroless copper plating solution according to claim 1, wherein the copper salt is selected from the group consisting of copper sulfate, copper nitrate, copper (II) chloride, copper formate, and mixtures thereof.

5. The electroless copper plating solution according to claim 1, wherein the complexing agent is selected from the group consisting of ethylenediamine tetraacetic acid, hydroxyethyl ethylene triacetic acid, cyclohexanediamine tetraacetic acid, diethylenetriamine pentaacetic acid, tetrakis(2-hydroxypropyl)ethylenediamine, and mixtures thereof.

6. The electroless copper plating solution according to claim 1, wherein the pH adjuster is selected from the group consisting of alkali hydroxide, tetramethylammonium hydroxide, tetraethylammonium hydroxide, and mixtures thereof.

7. The electroless copper plating solution according to claim 1, wherein the alkali hydroxide is lithium hydroxide, sodium hydroxide, or potassium hydroxide.

8. The electroless copper plating solution according to claim 1, wherein the plating solution has a hydrogen ion concentration (pH) of about 12.3 to about 12.8.

9. The electroless copper plating solution according to claim 1, further comprising an additive selected from the group consisting of 1,10-phenanthroline, 2,9-dimethyl-1,10-phenanthroline, polyalkylene glycol, and mixtures thereof.

10. A method of producing an electroless copper plating solution, comprising:
    dissolving a copper salt, a complexing agent and a reductant in water to prepare a plating solution;
    adjusting a hydrogen ion concentration (pH) of the plating solution in the range of about 11.5 to about 13.0 with a pH adjuster;
    dissolving 2,2-dipyridyl in a mixed solution of water and an acid to prepare a dipyridyl acid solution; and
    mixing the dipyridyl acid solution with the pH-adjusted plating solution.

11. The method of producing an electroless copper plating solution according to claim 10, wherein, in the step of adjusting a pH, the hydrogen ion concentration (pH) of the plating solution is adjusted to be about 12.3 to about 12.8.

12. The method of producing an electroless copper plating solution according to claim 10, wherein the copper salt is selected from the group consisting of copper sulfate, copper nitrate, copper (II) chloride, copper formate, and mixtures thereof.

13. The method of producing an electroless copper plating solution according to claim 10, wherein the complexing agent is selected from the group consisting of ethylenediamine tetraacetic acid, hydroxyethyl ethylene triacetic acid, cyclohexanediamine tetraacetic acid, diethylenetriamine pentaacetic acid, tetrakis(2-hydroxypropyl)ethylenediamine, and mixtures thereof.

14. The method of producing an electroless copper plating solution according to claim 10, wherein the reductant is selected from the group consisting of formaldehyde, paraformaldehyde, glyoxylic acid, and mixtures thereof.

15. The method of producing an electroless copper plating solution according to claim 10, wherein the pH adjuster is selected from the group consisting of alkali hydroxides, tetramethylammonium hydroxide, tetraethylammonium hydroxide, and mixtures thereof.

16. The method of producing an electroless copper plating solution according to claim 10, further comprising the step of adding an additive selected from the group consisting of 1,10-phenanthroline, 2,9-dimethyl-1,10-phenanthroline, polyalkylene glycol, and mixtures thereof into the plating solution.

17. The method of claim 10, wherein dissolving the copper salt, the complexing agent and the reductant in water is done sequentially.

18. A copper plating film prepared by the method of claim 10, wherein less than or equal to 10% of the surface area of the copper film exhibits blistering.

19. An electroless copper plating method, wherein the plating is performed with the electroless copper plating solution according to claim 1.

20. A copper plating film prepared by the electroless copper plating method of claim 19.

21. The method of producing an electroless copper plating solution according to claim 15, wherein the alkali hydroxides are lithium hydroxide, sodium hydroxide and potassium hydroxide.

* * * * *